INVENTOR.
ELVING J. KJELLSTROM

ATTORNEY 3,320,823
GRIP PULLEY
Elving J. Kjellstrom, 458 Oak St., Oregon, Wis. 53575
Filed July 20, 1965, Ser. No. 473,285
1 Claim. (Cl. 74—230.5)

ABSTRACT OF THE DISCLOSURE

A non-slip pulley for a drive belt such as a conventional V-belt wherein the web of the pulley has a first series of circumferentially spaced, radially extending sections curved outwardly from the plane of the web and a similar second series of sections alternately arranged with respect to the first and extending divergently from the plane of the web oppositely from the first series. Each of the sections has outwardly flared leading and trailing edges to prevent gouging of the belt. The sections form an undulating groove for gripping the belt.

---

This invention relates to pulleys and more particularly to a non-slip pulley for gripping a flexible drive belt such as a conventional V-belt.

In the past attempts have been made to design belt pulleys to eliminate a slippage between the pulley and the drive belt by roughening the inner surface of the peripheral groove of the pulley. While this method prevents slippage initially, it causes an abrasive action on the belt which causes the belt to wear rapidly and greatly reduces the effective working life of the belt. Furthermore, the wear on the sides of the belt causes slippage after a relatively short period of use.

Accordingly, an object of my invention is to provide a new and improved non-slip pulley having circumferentially alternating sections for gripping a drive belt.

Another object of my invention is to provide a non-slip pulley having two series of outwardly curved and circumferentially spaced sections forming a peripheral groove therebetween for receiving a drive belt in such a manner that the belt is gripped by the curved inner surfaces of said sections.

Another object of my invention is to provide a pulley for a drive belt wherein the pulley has two series of outwardly curved and circumferentially spaced sections for gripping a drive belt in undulating fashion therebetween for preventing slippage of the belt.

Further objects, features and advantages of my invention will be apparent from the following detailed description taken in conjunction with the accompanying drawings showing a preferred embodiment exemplifying the principles of my invention.

Figure 1:
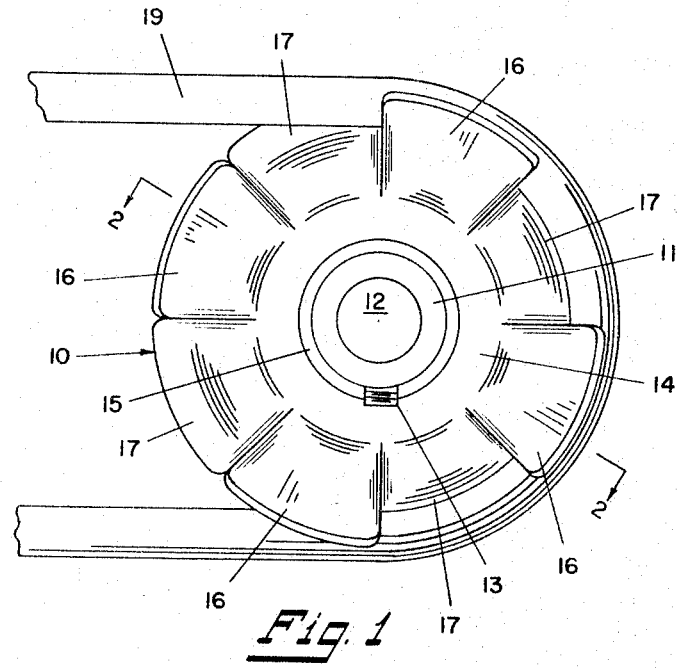
FIG. 1 is a side elevational view of a pulley embodying my invention.

Referring now more particularly to the drawings wherein like numerals designate like parts throughout the several views, my new and improved pulley is generally designated at 10 in FIG. 1. Pulley 10 has a hollow hub 11 adapted to receive a shaft 12 therethrough. The hub 11 may be secured to shaft 12 by any suitable means, such as for example, Allen screw 13. A generally cylindrical web 14 is rigidly secured to hub 11 by suitable attaching means. In the particular pulley shown for exemplification in the drawings, the hub 11 and web 14 are made of steel and are secured together by welding as shown by bead 15.

Figure 2:
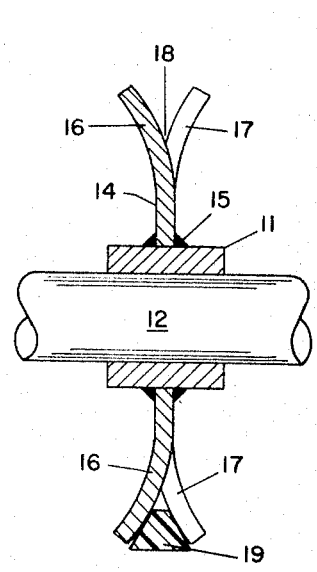
FIG. 2 is a cross-sectional view taken along line 2—2 of FIG. 1.

The web 14 has a first series of circumferentially spaced and radially extending sections 16 which are curved outwardly from the plane of web 14 as best shown in FIG. 2. A second series of circumferentially spaced and radially extending sections 17 are circumferentially alternately arranged with respect to the sections 16. The sections 17 are curved outwardly from the plane of web 14 oppositely from sections 16. The divergent sections 16 and 17 and web 14 may be formed from a single steel plate as shown in the drawings.

As best seen in FIG. 2, sections 16 and 17 form a tapered peripheral groove 18 therebetween for receiving a conventional V-belt 19. The belt 19 is tightly gripped by the alternating curved sections 16 and 17 for preventing slippage of the belt.

Figure 3:
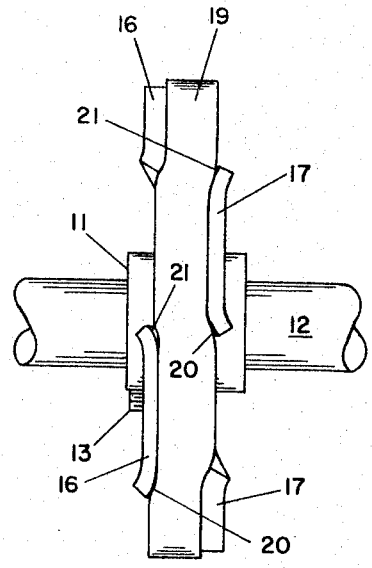
FIG. 3 is an edge view of my invention looking from the right side of FIG. 1.

Referring to FIG. 3, the leading and trailing edges 20 and 21, respectively, of each of sections 16 and 17 are flared outwardly for preventing excessive wear on the sides of the belt 19 and for preventing the edges of the sections from gouging the belt. As best seen in FIG. 3, the belt 19 "snakes" between the alternating gripping sections 16 and 17 in an undulating fashion. This prevents the belt 19 from slipping even when it is somewhat loose.

While the pulley 10 shown has a total of eight alternating, gripping sections, my invention is not limited to a pulley having only that number of sections and more or less gripping sections may be provided as desired for various uses and belt sizes.

Furthermore, it is not intended to limit the use of my invention to belts having a generally V-shaped cross-section as shown for exemplification in the drawings, but it may be effectively employed in connection with round and other shaped belts.

My new pulley which provides an improved belt gripping action with its alternating belt gripping sections may be produced from considerably less material and, thus, much cheaper than conventional belt pulleys which have a belt groove formed by a pair of continuous side walls extending from a double thickness web.

While the pulley 10 shown is made of a steel web welded to a steel hub, the web may be attached by any other suitable means such as rivets or the like. The pulley may be made of other metals such as for example aluminum and the web and hub may be die cast as a single unit. The pulley may also be molded of a substantially rigid non-metallic material such as plastic or the like.

It is understood that my invention is not confined to the particular construction and arrangement of parts herein illustrated and described, but embraces all such modified forms thereof as may come within the scope of the following claim.

I claim:

A pulley for a flexible drive belt such as a conventional V-belt, said pulley comprising:

(a) a hub for receiving a shaft, (b) a generally cylindrical web attached to said hub,
(c) said web having a first series of circumferentially spaced and radially extending integral sections curved outwardly from the plane of said web,
(d) said web having a second series of circumferentially spaced and radially extending integral sections circumferentially alternately arranged with respect to said first series of sections and curved outwardly from the plane of said web oppositely from said first series of sections,
(e) said sections having outwardly flared leading and trailing edges, and
(f) said first and second series of sections forming an undulating peripheral groove therebetween for gripping said belt.

References Cited by the Examiner
UNITED STATES PATENTS 1,668,778  5/1928  Menningen _____ 74—230.5

FOREIGN PATENTS 79,396  9/1950  Czechoslovakia.

FRED C. MATTERN, Jr., *Primary Examiner.*

J. A. WONG, *Assistant Examiner.*